(12) United States Patent
Pernstich et al.

(10) Patent No.: US 9,146,102 B2
(45) Date of Patent: *Sep. 29, 2015

(54) OBSERVATION DEVICE WITH RANGE FINDER

(71) Applicant: Swarovski-Optik KG., Absam (AT)

(72) Inventors: Ludwig Pernstich, Rum (AT); Konrad A. Roider, Mils (AT); Andreas Zimmermann, Fulpmes (AT); Gavin Lancaster, Innsbruck (AT)

(73) Assignee: Swarovski-Optik KG. (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,184

(22) Filed: Feb. 4, 2014

(65) Prior Publication Data

US 2014/0152973 A1 Jun. 5, 2014

Related U.S. Application Data

(63) Continuation of application No. 13/865,722, filed on Apr. 18, 2013, now Pat. No. 8,717,548, which is a
(Continued)

(30) Foreign Application Priority Data

| Jan. 31, 2008 | (AT) | ..................................... | 153/2008 |
| Feb. 1, 2008 | (AT) | ..................................... | 163/2008 |
| Feb. 2, 2008 | (EP) | ..................................... | 08001979 |

(51) Int. Cl.
*G01C 3/04* (2006.01)
*B25G 1/00* (2006.01)
(Continued)

(52) U.S. Cl.
CPC .. *G01C 3/04* (2013.01); *B25G 1/00* (2013.01); *B25G 1/102* (2013.01); *F41G 3/06* (2013.01);
(Continued)

(58) Field of Classification Search
CPC ....... G01S 7/4812; G01S 17/023; G01C 3/08; G01C 3/04; G02B 7/12; G02B 23/10
USPC ............. 356/3.01–3.15, 4.01–4.1, 5.01–5.15, 356/6–22, 28, 28.5
See application file for complete search history.

(56) References Cited

U.S. PATENT DOCUMENTS

| 3,622,242 A | 11/1971 | Land et al. |
| 3,680,946 A | 8/1972 | Bellows |

(Continued)

FOREIGN PATENT DOCUMENTS

| CH | 503259 A | 3/1971 |
| DE | 6918690 U | 12/1969 |

(Continued)

OTHER PUBLICATIONS

"Experience Your Vision", New: Victory RF Binoculars, leaflet published in the Internet, Jan. 14, 2008.
(Continued)

*Primary Examiner* — Luke Ratcliffe
(74) *Attorney, Agent, or Firm* — Lerner, David, Littenberg, Krumholz & Mentlik, LLP

(57) ABSTRACT

The invention describes a long-range optical device with two observation parts and a first observation beam path and a measurement beam path, in which the two observation parts are arranged essentially parallel next to each other and spaced a predefinable distance apart via at least one connection element. In a plan view of the device 1 with respect to a plane, in which the longitudinal axes of the observation parts are arranged, the sub-regions of the observation parts facing each other lie directly opposite each other over a length aligned parallel to the longitudinal axis of the observation parts of 20% to 90%, preferably 30% to 80% of a length of the observation parts. In addition, the observation beam path and the measurement beam path are arranged outside the sub-regions of the observation parts.

21 Claims, 8 Drawing Sheets

Related U.S. Application Data continuation of application No. 12/865,481, filed as application No. PCT/AT2009/000038 on Jan. 30, 2009, now Pat. No. 8,441,621.

(60) Provisional application No. 61/137,406, filed on Jul. 30, 2008.

(51) Int. Cl.

| | | |
|---|---|---|
| *B25G 1/10* | (2006.01) | |
| *F41G 3/06* | (2006.01) | |
| *G01S 7/481* | (2006.01) | |
| *G01S 17/02* | (2006.01) | |
| *G01S 17/08* | (2006.01) | |
| *G01S 17/10* | (2006.01) | |
| *G02B 7/06* | (2006.01) | |
| *G02B 7/12* | (2006.01) | |
| *G02B 23/04* | (2006.01) | |
| *G02B 23/10* | (2006.01) | |
| *G02B 23/18* | (2006.01) | |

(52) U.S. Cl.
CPC ............. *G01S 7/4812* (2013.01); *G01S 17/023* (2013.01); *G01S 17/08* (2013.01); *G01S 17/10* (2013.01); *G02B 7/06* (2013.01); *G02B 7/12* (2013.01); *G02B 23/04* (2013.01); *G02B 23/10* (2013.01); *G02B 23/18* (2013.01); *G01S 7/4817* (2013.01)

(56) References Cited

U.S. PATENT DOCUMENTS

| | | | |
|---|---|---|---|
| 4,262,990 A | 4/1981 | Kamakura | |
| 4,886,347 A | 12/1989 | Monroe | |
| 5,126,549 A | 6/1992 | Yamada | |
| 5,235,458 A | 8/1993 | Akagi et al. | |
| 5,610,761 A | 3/1997 | Ishibashi et al. | |
| 5,616,903 A | 4/1997 | Springer | |
| 5,644,425 A | 7/1997 | Palmer | |
| 5,771,407 A | 6/1998 | Imafuji et al. | |
| 5,923,468 A | 7/1999 | Tsuda et al. | |
| 6,142,636 A | 11/2000 | Nemoto et al. | |
| 6,204,961 B1* | 3/2001 | Anderson et al. | 359/353 |
| 6,233,094 B1 | 5/2001 | Tsuda | |
| 6,266,185 B1 | 7/2001 | Miller et al. | |
| 6,292,314 B1 | 9/2001 | Perger | |
| 6,330,056 B1 | 12/2001 | Zadravec | |
| 6,580,495 B2 | 6/2003 | Shirai | |
| 6,753,951 B2 | 6/2004 | Fukumoto | |
| 7,244,033 B2 | 7/2007 | Yamanouchi | |
| D579,472 S | 10/2008 | Yanagisawa | |
| 7,483,208 B2 | 1/2009 | Zadravec | |
| 7,654,029 B2 | 2/2010 | Peters et al. | |
| 7,738,082 B1 | 6/2010 | Peters | |
| 2001/0028450 A1 | 10/2001 | Zadravec | |
| 2001/0028498 A1 | 10/2001 | Haga et al. | |
| 2002/0071126 A1 | 6/2002 | Shirai et al. | |
| 2003/0002149 A1 | 1/2003 | Watanabe | |
| 2003/0086072 A1 | 5/2003 | Fukumoto et al. | |
| 2004/0046953 A1 | 3/2004 | Nagata et al. | |
| 2005/0036129 A1* | 2/2005 | Watanabe | 356/4.01 |
| 2006/0193039 A1 | 8/2006 | Yamauchi et al. | |
| 2007/0097351 A1 | 5/2007 | York et al. | |
| 2007/0174152 A1 | 7/2007 | Bjornberg et al. | |
| 2008/0007826 A1 | 1/2008 | Smith et al. | |
| 2009/0141371 A1 | 6/2009 | Brown et al. | |
| 2009/0201581 A1 | 8/2009 | Gebelein | |

FOREIGN PATENT DOCUMENTS

| | | |
|---|---|---|
| DE | 2502662 A1 | 8/1975 |
| DE | 2714412 A1 | 10/1978 |
| DE | 29518708 U | 1/1996 |
| DE | 19727988 A1 | 1/1998 |
| DE | 19801519 A1 | 7/1998 |
| DE | 19933172 C1 | 1/2001 |
| DE | 10122936 A1 | 11/2001 |
| DE | 102004054182 A1 | 11/2001 |
| DE | 202006017705 U1 | 1/2007 |
| EP | 0932065 A1 | 7/1999 |
| EP | 0961147 A1 | 12/1999 |
| EP | 1069442 A2 | 1/2001 |
| EP | 1298480 A1 | 4/2003 |
| EP | 1744196 A1 | 1/2007 |
| EP | 1783529 A1 | 5/2007 |
| EP | 2078975 A1 | 7/2009 |
| GB | 1477201 A | 6/1977 |
| GB | 1600191 A | 10/1981 |
| JP | 2002098762 A | 4/2002 |
| JP | 2007127690 A | 5/2007 |
| WO | 8802125 A1 | 3/1988 |
| WO | 9711399 A1 | 3/1997 |

OTHER PUBLICATIONS

Binoculars, Celestron SkyMaster 71009, Mar. 2005.
International Search Report, PCT/AT2009/000037, dated Sep. 30, 2009.
International Search Report, PCT/AT2009/000038, dated Jul. 14, 2009.
International Search Report, PCT/AT2009/000039, dated Jun. 25, 2009.

* cited by examiner

OBSERVATION DEVICE WITH RANGE FINDER

CROSS REFERENCE TO RELATED APPLICATIONS

The present application is a continuation of U.S. patent application Ser. No. 13/865,722, filed Apr. 18, 2013, which is a continuation, of U.S. patent application Ser. No. 12/865,481, filed on Jul. 30, 2010, which application is a national phase entry under 35 U.S.C. §371 of International Application No. PCT/AT2009/000038, filed Jan. 30, 2009, published in German, which claims the benefit of Austrian Patent Application No. A 153/2008, filed Jan. 31, 2008; Austrian Patent Application No. A 163/2008, filed Feb. 1, 2008; European Patent Application No. 08001979.7, filed Feb. 2, 2008; and U.S. Provisional Application No. 61/137,406, filed Jul. 30, 2008. The disclosures of said applications are incorporated by reference herein.

BACKGROUND OF THE INVENTION

The invention relates to a long-range optical device having at least two tubes corresponding to the features in the preambles of claims 1 to 4.

Binocular field glasses with a laser range finder are known, in which a functional element of the laser range finder is also integrated into one of the two visual beam paths. Thus, as described in DE 10 2004 054 182 B4, the objective-side beam path of one of the two observation beam paths of the field glasses simultaneously forms a part of the beam path of the laser receiver and the laser radiation reflected by the object is deflected to the laser receiver or detector respectively by means of an optical splitter. On the other hand a separately constructed beam path is provided for the laser transmitter, arranged in the region of the hinging axis of the field glasses and aligned parallel to the observation axes of the visual beam path. A collimation lens is provided for this purpose in front of the laser transmitter on the light output side. A disadvantage of these binoculars with a laser range finder is that the handling of the device is made more difficult and none of the desired ergonomics is possible in such binoculars with this corresponding configuration.

Furthermore, it is already known from U.S. Pat. No. 6,753,951 B2 to provide a laser range finder in a long-range optical device which can be used to observe a remote object via a visual beam path. In this arrangement a laser beam is introduced into the visual beam path between the eye of the observer and user of the visual beam path and a focusing device for the visual beam path, and the laser beam reflected by the object is fed to a laser receiver for analysis via an optical system in front of the eye of the user. A disadvantage of this is that a rotating screen driven by a motor is required, in order to maintain a separation of the emitted laser beam and the reflected laser beam.

Further known long-range optical devices have dedicated beam paths both for the visual beams and the laser beam and the reflected laser beams, which are directed towards the remote object via separate optical devices. The focusing of the laser beam in such arrangements, both for the emitted laser beam and for the laser beam reflected from the object, is effected via respectively dedicated focusing devices, which are drive-connected to the focusing device for the visual beam path activated by the operator. Due to the complex structure, a large number of mechanical and optical components are required.

Other long-range optical devices, for example that in DE 197 27 988 A1 and those of DE 69 18 690 U, DE 295 18 708 U1, DE 101 22 936 A1 and DE 27 14 412 A1 also described a very wide range of configurations of laser range finders in connection with visual beam paths, wherein an exact measurement result cannot be achieved however, due to the complex structure and the guiding of the beam.

SUMMARY OF THE INVENTION

The problem addressed by the invention is to create a long-range optical device having at least two tubes, with which an exact sighting of a target and an increased user-friendliness is obtained in devices such as this with integrated range finding.

The problem addressed by the invention is solved by a long-range optical device as named above, by the fact that, when viewed vertically from above with respect to a plane in which the longitudinal axes of the observation parts are arranged, over a length extending parallel to the longitudinal axis (8,9) of the observation parts of 20%-90%, preferably 30%-80% of the length of the observation parts, the sub-regions facing each other of the observation parts lie directly opposite each other, and that the observation beam path and the measurement beam path are arranged outside the sub-regions of the observation parts that lie directly opposite each other. An advantage of this embodiment is then the fact that, in spite of the integration of a range-finding device into the long-range optical device, a balanced weight distribution is obtained, which facilitates an accurate sighting of the target. In addition is the fact that due to the larger gripping area, the handling of the device, and therefore the user-friendliness when adjusting the spacing between the tubes and when handling the long-range optical device for sighting a target are considerably improved. This also enables the long-range optical device to be held in a sighting position for longer and without fatigue, so that jitter-free sighting of a target is possible over a fairly long period, as is required for example in the various tasks associated with hunting. This achieves a better approach to the target and a continuously successive determination of the range. Furthermore, the arrangement of the measurement beam path outside the sub-regions mentioned guarantees that while the device is being held no shading or other contamination of the measurement beam occurs due to the user's hands.

Independently of this the problem addressed by the invention is also solved by means of a long-range optical device by the fact that the width of the connection element or the sum of the widths of multiple connection elements between the two observation parts in the direction of the longitudinal axes is less than 45% of the length or the distance between the objective-side and the ocular-side end of the device. Using this arrangement it is also possible to introduce all of the fingers except the thumbs between the observation parts, in order to hold the device in as stable a manner as possible during the measurement procedure. Furthermore, the advantage is gained that in such an arrangement both the thumbs are free to activate switches for starting the measurement procedure.

Also advantageous is another independent embodiment in which the width of the connection element or the sum of the widths of multiple connection elements between the two observation parts (3,4) along the longitudinal axes is less than 90 mm. This makes it possible to create a region on the device which facilitates the gripping of the observation parts from their upper side. It is possible furthermore, due to the small adverse influence of the connection elements to provide the user with a choice of gripping positions.

The problem can also be independently solved by the fact that between an objective-side front face of the connection element and the objective-side end of the observation parts or of the device or of an ocular-side front face of a further connection element, the side faces of the observation parts that face each other over a length of the observation parts extending parallel to the longitudinal axis (8,9) of 20%-90%, preferably 30%-80% of the length of the observation parts, lie directly opposite each other, and the fact that the observation beam path and the measurement beam path are arranged outside the side faces of the observation parts that lie directly opposite each other. The advantage of this construction lies in the possibility for the user to hold the device by its upper side, in the space between the observation parts in the region of the centre of gravity using only a frictional connection.

Another independent embodiment is characterized in that between an ocular-side front face of the connection element and the ocular-side end of the observation parts or of the device, the side faces of the observation parts that face each other over a length of the observation parts aligned parallel to the longitudinal axis (8,9) of 20%-90%, preferably 30%-80% of the length of the observation parts, lie directly opposite each other. It is thus possible advantageously, as well as the graspability of the observation parts from the top of the device, to manage without any inconvenient connection element in the ocular-side end region and thus in the region of the user's nose. It is furthermore to be seen as advantageous that a further beam path can be provided on the connection element in the objective-side end, so that again, while the device is being held no shading or other contamination of the measurement beam occurs due to the user's hands.

A further advantageous embodiment is one in which the observation parts are supported via two connection elements at a predefinable distance apart and in plan view on to the plane the two connection elements are separated by sub-regions of the observation parts lying directly opposite each other and facing each other. In this variant embodiment weight can be saved in comparison to a classic, solid construction, however a precise parallelism of the beam paths can be guaranteed in both the observation parts at the same time.

An advantage of another embodiment furthermore is that the observation parts are supported via two connection elements at a predefinable distance apart and in plan view on to the plane the sub-regions of the observation parts that face each other lie directly opposite each other between the two connection elements over a length of the observation parts aligned parallel to the longitudinal axis of more than 30 mm, preferably 50 to 120 mm, and so an adequate grip region is created, which allows the device to be comfortably held in the transport position, 90° offset to the usage position, about the pivot axis.

According to a further design variant it is possible that a part of the measurement beam of a measurement beam transmitter is integrated into the first observation beam path, in order to guarantee an optimal synchronization of the two beam paths.

An advantage of the configuration is that a part of the multi-beam path of a measurement beam receiver is integrated into the first observation beam path, and so due to the larger objective of an observation beam path relative to a classical measurement beam objective a larger proportion of the reflected measurement radiation can be received.

In a construction in which a part of the measurement beam path of the measurement beam transmitter and a part of the measurement beam path of the measurement beam receiver are integrated into the first observation beam path, it is possible to combine the advantages of the synchronization of the measurement beam path and the observation beam path with the increased received power of the returning measurement radiation.

It is further advantageous if at least one optical component is arranged in order to feed the measurement beam path of the measurement beam transmitter and feed the measurement beam path of the measurement beam receiver respectively into and out of the first observation beam path, since this makes a separation or integration of the measurement and the observation beam path possible.

A configuration that has proven advantageous here is one in which the regions for feeding the beams in and out are arranged on a single surface of the optical component, since both the complexity and the length of the device can be reduced.

According to a further advantageous extension in which a laser transmitter is arranged as a measurement beam transmitter and a laser receiver as a measurement beam receiver, the measurement beam can be highly focused and thus good measurement results are achieved.

Also advantageous however is a construction with an integration of at least one part of a beam path of an opto-electronic display element in the, or one of the, observation beam paths, since this guarantees a display in the field of view of the user and therefore an interpretation by the user which maintains visual contact with the object.

It is also possible to arrange a first focusing device, by which the observation beam path and the measurement beam path can be focused or that the measurement beam path can be focused with a further focusing device, wherein the further focusing device is operatively connected to the first focusing device. This makes it possible in an advantageous way that both the measurement beam path and the observation beam path are synchronously focused on to an object, which means that an improved return power of the measurement beam is achieved.

The further configuration having a device for determining the propagation time, which is connected directly or via a control and analysis unit to the measurement beam transmitter, the measurement beam receiver and the opto-electronic display element, guarantees an electronic display of the value of the distance to the object measured by determining a propagation time.

An advantageous construction is one in which a switching device is arranged between the opto-electronic display element and the control and analysis unit, for displaying different symbols or data, for example a target mark and/or a measurement. This makes it possible to display different target mark representations or measurement formats via the opto-electronic display.

By means of the extension in which an opto-electronic display element is connected to a switching device for optionally feeding in the beam path for displaying a target mark and/or a measurement in at least one of the observation beam paths, it is possible for the user to decide, depending on his preference or visual capacity, on which display element a certain value or the target mark is to be displayed.

By means of the extension in which at least one tubular housing of the observation part consists of a light metallic material, in particular magnesium or a magnesium based alloy, the weight of the device can be substantially reduced and at the same time as increasing the rigidity of the housing.

According to a further advantageous construction at least one tubular housing of the observation part consists of composite material, in particular fiber-reinforced plastic. This means that the breaking strength of the housing can be increased while at the same time reducing the weight.

Another advantageous construction is one in which the pivoting range of the hinge or hinges for varying the distance between the two longitudinal axes of the observation parts in the plane extending through them is at least between 50 mm and 70 mm. It is thus possible to adjust the device optimally to the inter-eye distance of the user.

In the further configuration in which both the observation parts are pivotably connected via a connection element in the form of a hinge to a pivot axis extending approximately parallel to the longitudinal axes of both observation parts, it is advantageous that an adaptation of the inter-eye spacing to different users is possible.

If each connection element comprises a connection arm arranged or formed on each of the two observation parts, then firstly an exact machining and alignment of the component is possible, and secondly when joining them together an exact mutual alignment can be achieved.

Another advantageous embodiment is one in which one or more hinged bridges are arranged as the connecting element. This allows a precise pivoting of the two observation parts.

It is also advantageous if the focusing device is connected to the adjustment drive. This makes an automatic adjustment of the focusing possible, and moreover in combination with the use of the value from the range measurement produces options for an auto-focusing procedure.

Another possibility is to connect the control and analysis unit to the adjustment drive or a drive motor, for example a stepper motor. This means that an automated setting of the focus is possible using cheap components, which in addition have a low weight.

Finally however a construction is also possible in which all optical, opto-electrical and electrical components in the two observation parts are arranged symmetrically with respect to the pivot axis, which means an optimal weight distribution is obtained. Furthermore, both parts can be used when taken on their own as long-range optical devices.

To allow a better understanding of the invention this will be explained in more detail with the aid of the following drawings.

In a highly simplified schematic representation, they show:

DETAILED DESCRIPTION

It should first of all be noted that in the various embodiments described, equivalent parts are assigned identical labels or component designations respectively, the disclosures contained in the entire description being analogously transferrable to equivalent parts with identical labels or component designations. Also, the positional details chosen in the description, such as above, below, to the side etc., refer to the immediately described and illustrated Figure, and when there is a change of position are to be carried over analogously to the new position. Further, individual features or feature combinations from the various exemplary embodiments shown and described can also represent, per se, solutions that are independent, inventive or according to the invention.

All information on value ranges in the description of the subject matter are to be understood in the sense that they also comprise any and all sub-ranges thereof, e.g. the range 1 to 10 is to be understood to mean that all sub-ranges, starting at the lower limit 1 and the upper limit 10 are also included, i.e. all sub-ranges begin with a lower limit of 1 or greater and end at an upper limit of 10 or less, e.g. 1 to 1.7, or 3.2 to 8.1 or 5.5 to 10.

Figure 1:
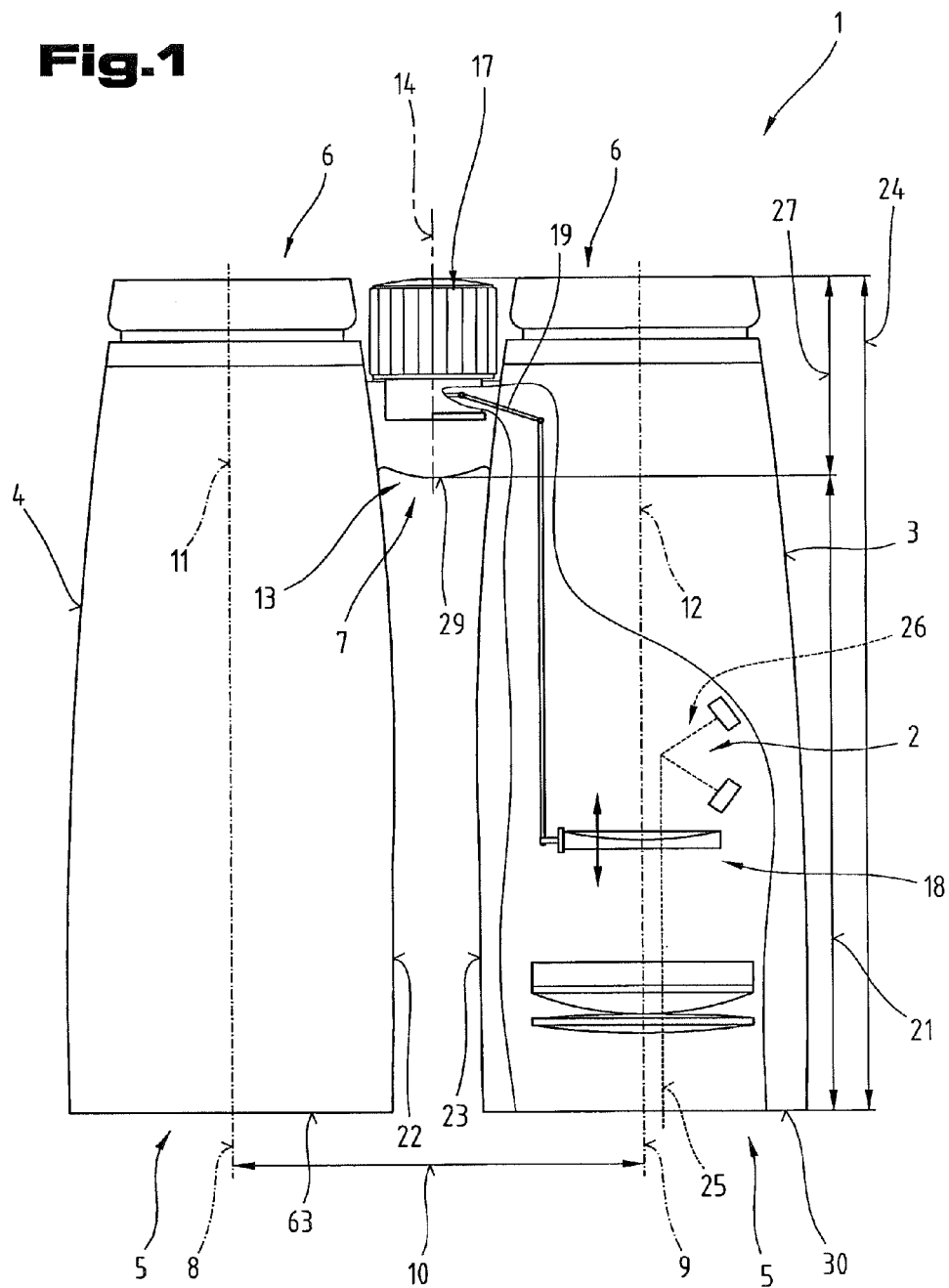
FIG. 1 is a long-range optical device constructed according to the invention in plan view.
Figure 2:
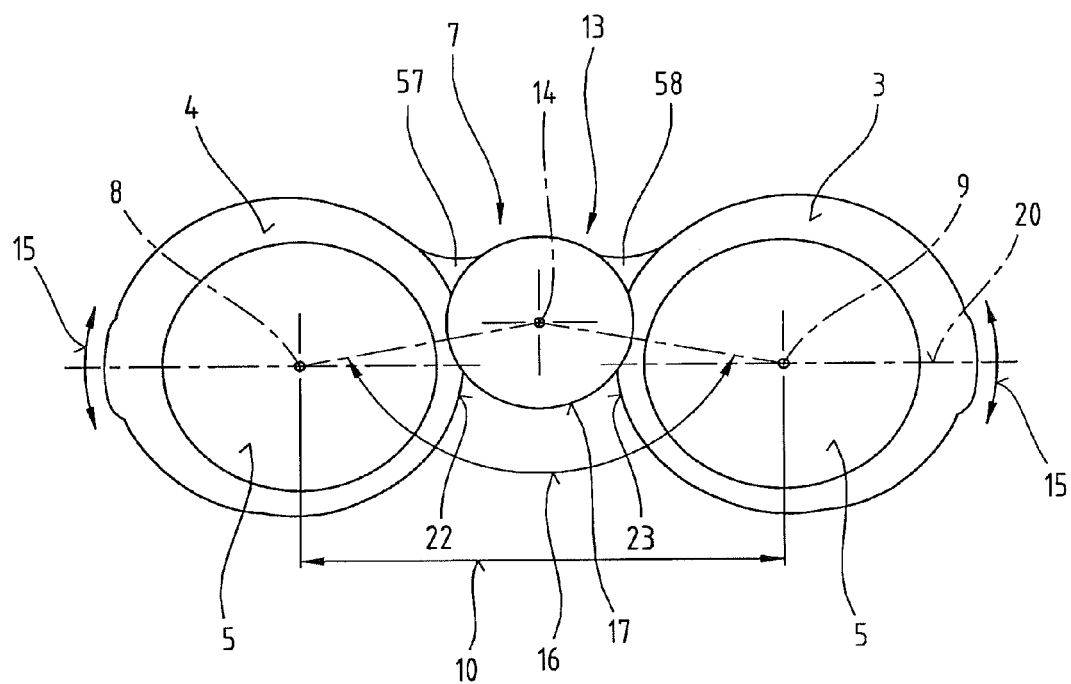
FIG. 2 is the long-range optical device according to FIG. 1 in a front view.
Figure 3:
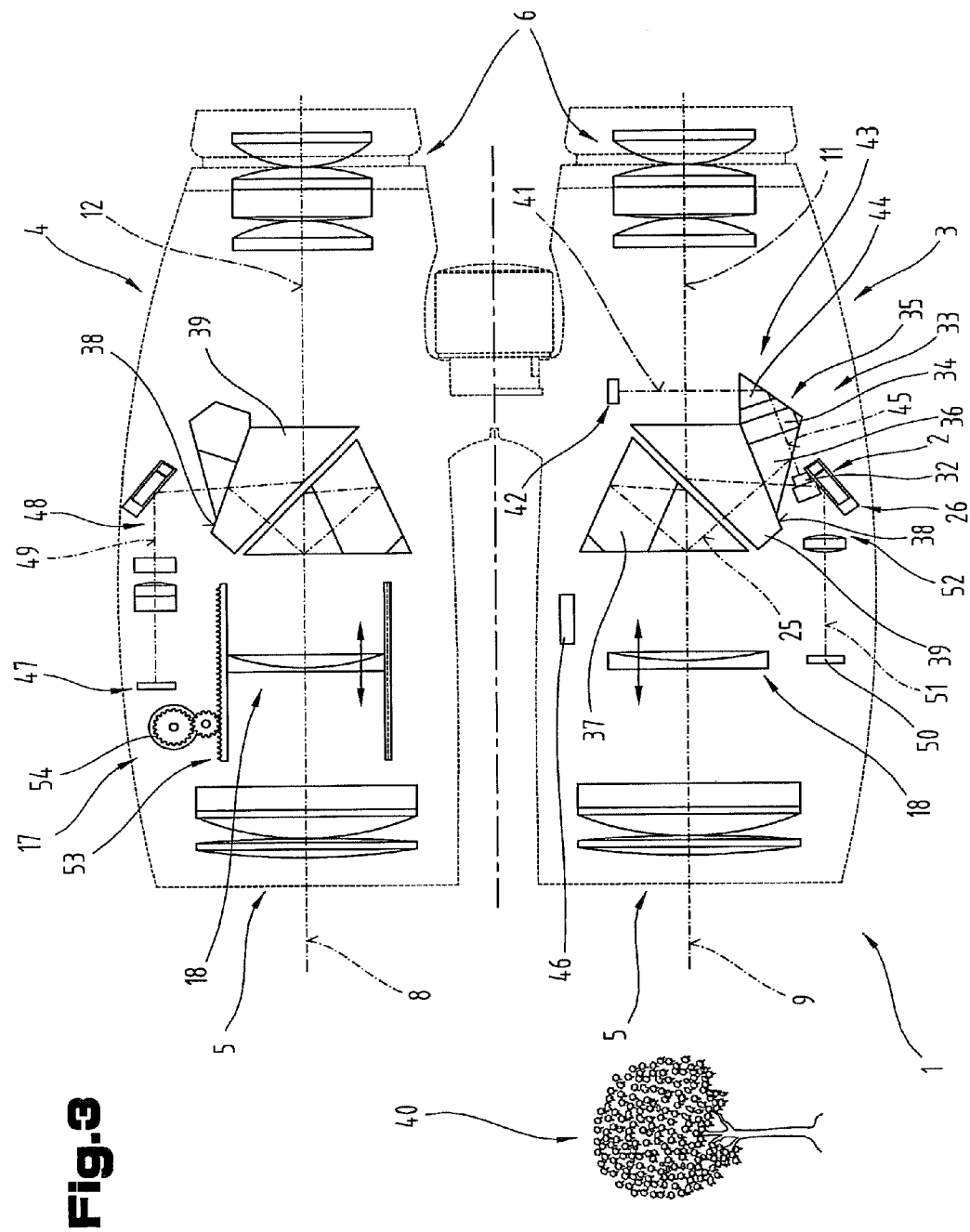
FIG. 3 is an optical layout of the long-range optical device according to FIGS. 1 and 2 with integrated laser range finder in a schematic plan view.

In FIGS. 1 to 3 a long-range optical device 1 is shown, for example a binocular observation device, in particular a pair of binoculars with an integrated measurement device 2 e.g. a laser range finder. The device 1 comprises a first observation part 3 and a second observation part 4 which are preferably of a tubular construction. The two observation parts 3 and comprise an objective 5 and an ocular 6 to provide an enlarged representation of an object to be observed. The two observation parts 3 and 4 are connected together via a connection element 7 in such a way that they are arranged next to each other in a position essentially parallel to their longitudinal axes 8, 9. These longitudinal axes 8, 9 can be arranged at a different distance 10 apart from each other, and simultaneously form the first and second observation beam paths 11 and 12, which in each case symbolize only the corresponding main beams or the corresponding optical axes of the observation parts 3 and 4 and are shown in simplified form.

It is advantageous in this case if the two observation parts 4 are constructed in the same manner, for example preferably symmetrically relative to a hinge 13 with pivot axis 14, arranged between two observation beam paths 11, 12. This is reminiscent in particular of the variant embodiment of the main housing of the observation parts 3, 4 and the structure of the focusing devices. Individual details can differ, such as for example the connection elements 7, which can for example also interlock and are accordingly constructed to be mirror-inverted and overlapping.

It is a general convention here that in the entire description, whenever beam paths are mentioned a bundle of beams, that is, a so-called homocentric beam bundle, is to be understood.

In order to adjust this distance 10 the two observation parts 3, 4 are connected together via a hinge 13, which can form the connection element 7 or can be arranged in the path of the connection element, so that they can pivot about a pivot axis 14 extending parallel to the longitudinal axes of the observation parts 3, 4.

Therefore the two observation parts 3, 4, as can best be seen from FIG. 2, can be pivoted about this pivot axis 14 as shown by the arrow 15 through an angular range 16, in order to be able to match the distance 10 between the longitudinal axes or the beam paths 11, 12 to the eye spacing of the respective user of the long-range optical device 1. An adjustment of the distance of at least between 50 and 70 mm is advantageous, however of course any desired construction can be used to allow this distance to be changed to smaller or larger values.

In the region of the connection element 7 it is also possible to provide an adjustment device 17 for a focusing device 18, with which the device 1 can be focused on the target being sighted. The transmission elements 19, illustrated only schematically, for the focusing device 18 can here, as schematically indicated in FIG. 1, be at least partially passed through the connection element 7.

As is most clearly seen from FIG. 1 furthermore, in the plan view of the device 1 perpendicular with respect to a plane 20 in which the longitudinal axes 8, 9 are arranged, over a length 21 extending parallel to the longitudinal axis 8, 9 of the observation parts 3, 4, the sub-regions 22, 23 of the observation parts 3, 4 that face each other lie directly opposite each other. In other words, the distance between the nearest lying points of the housing of the observation parts 3, 4 is not reduced by any components protruding beyond them, and therefore none of the components projects beyond the outer casing of the observation parts 3, 4 in the direction of the opposite sub-region 22, 23 of the other observation part, and neither does any component of the connection element 7 project into this region between the two sub-regions 22, 23 in the direction of the longitudinal axes 8, 9. Obviously under this definition of the sub-regions 22, 23 lying opposite each other this is understood to mean the outermost enclosure of the observation parts 3 and 4. If these observation parts 3, 4 have a main housing, which is fitted with or at least partially enclosed by reinforcement elements and/or cladding elements, each of the outer bounding ends of the observation parts 3, 4 are to be understood as the nearest lying points of the housing of the observation parts 3, 4.

This length 21 can be more than 30 mm, preferably 50 to 120 mm, but can also be specified as a proportion of the length 24 of the observation parts 3, 4 aligned along the longitudinal axes 8, 9 of the observation parts 3, 4. In this case the length 21 over which the sub-regions 22, 23 facing each other of the observation parts 3, 4 lie directly opposite each other, can be for example between 20% and 90%, preferably 30 to 80%, of the length 24 of the observation parts 3, 4.

As the illustrations in FIGS. 1 and 3 show further, the longitudinal axes 8, 9 of the observation parts 3, 4 and thus also the observation beam paths 11, 12 and a measurement beam path 25 of the laser range finder 26, also lie outside the sub-regions 22, 23 of the observation parts 3, 4 lying directly opposite each other.

The arrangement in which a correspondingly long length 21 of the sub-regions 22, 23 of the observation parts 3, 4 lie directly opposite each other, then also facilitates a simpler and more secure grip both when using the device 1 for sighting a target and when handling the device 1 but also allows the device 1 to be steadily held in position. This means that a considerable improvement over previously known observation devices with measurement beams, for example for range measurement, can be achieved in all usage scenarios. With this type of grip, in which the ends of the fingers can protrude unhindered between the two observation parts 3, 4, a lower level of muscle strain in the hands can also be achieved, and therefore fatigue-free sighting and measurement is also possible over a longer period with the device 1 according to the invention.

Furthermore, it is now possible advantageously to fix and hold devices 1 of this kind solely by clamping them between the fingers and the balls of the thumbs, without any clamping force from the user's thumb being required.

Figure 4:
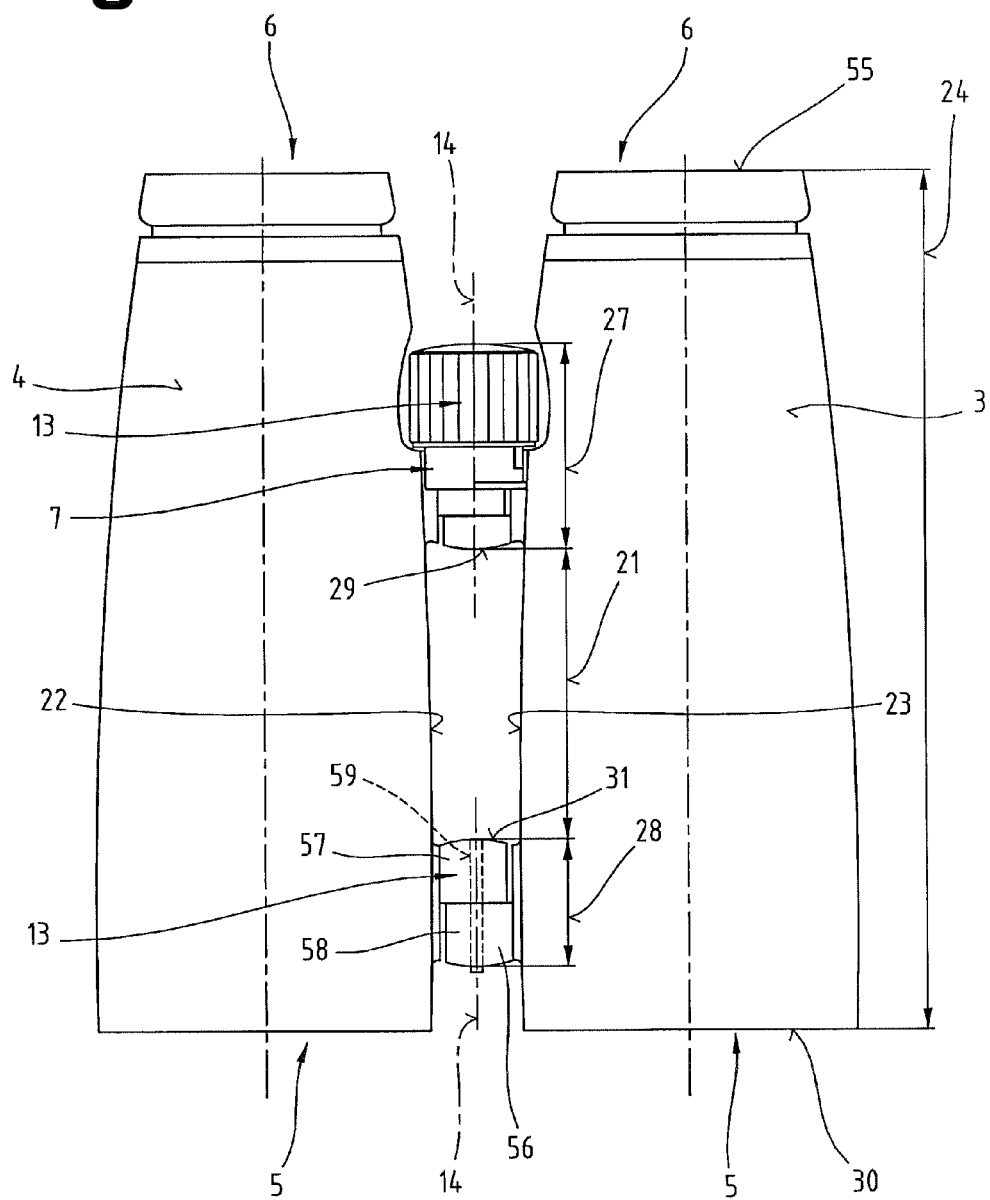
FIG. 4 is another variant embodiment of the long-range optical device in plan view.
Figure 5:
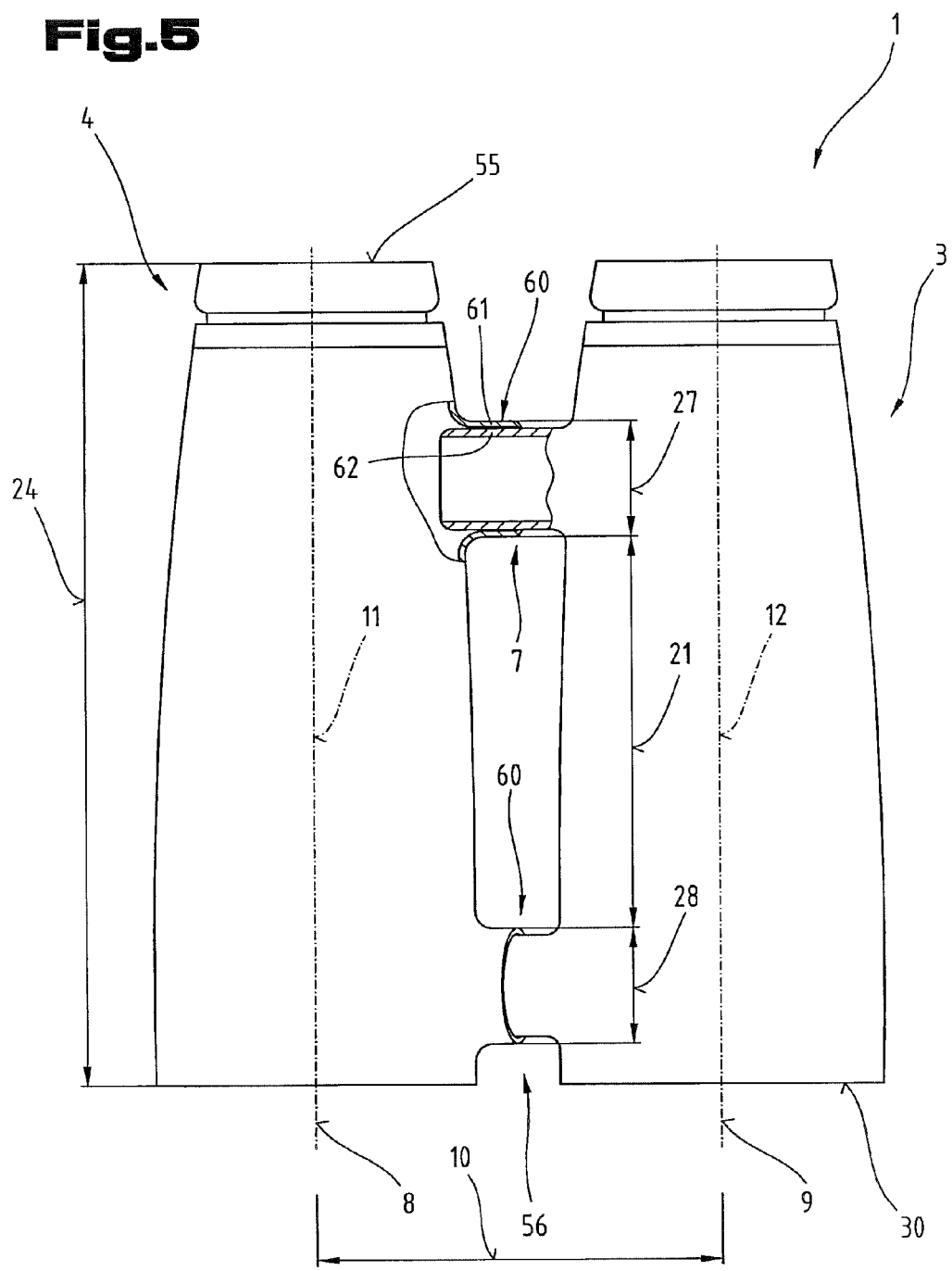
FIG. 5 is a further variant embodiment of the long-range optical device with specially constructed connection elements in plan view.

In another independent solution to the problem addressed by the invention however, it is advantageous if a width 27 of the connection element 7, or in case multiple connection elements 7 for holding and guiding the two observation parts 3, 4 are arranged, the sum of the widths 27, 28 of the connection elements 7—as shown in even more detail in FIG. 4 or 5—between the two observation parts 3, 4 along their longitudinal axes 8, 9 is smaller than 45% of the length 24 or the distance between the objective-side and the ocular-side end of the device 1. Here also, when measuring the length 24 or the distance between the objective-side and the ocular-side end, in each case the outermost limits in the region of the objective 5 or the ocular 6 of the main device (that is, without accessories) are assumed.

An advantageous independent solution of the problem addressed by the is also however obtained if the side faces 22, 23 of the observation parts that face each other lie directly opposite each other over a length 21 of the observation parts 3, 4 aligned parallel to the longitudinal axis 8, 9 which is between 20%-90%, preferably 30%-80% of the length 24 of the observation parts 3, 4, between an objective-side front face 29 of the connection element 7 and an objective-side end 30 of the observation parts 3, 4 or of the device 1.

This also allows the above mentioned advantages and effects to be obtained with particular advantage.

The same also applies if this length over the sub-regions 22, 23, or side faces of the observation parts 3, 4 that face each other, lies between the objective-side front face 29 of the connection element 7 arranged on the region of the ocular 6 and an ocular-side front face 31 of a further connection element 56 arranged in the region of the objective 5.

FIG. 3 shows a schematic illustration of the optical components of the long-range optical device 1. In this FIG. 3 the measurement device 2 is also shown in greater detail. Thus in the observation part 3 a measurement beam transmitter 32 is shown, with a transmitter optical system 33 and a transmission lens 34. The measurement beam transmitter 32 is integrated into the first observation part 3 in such a way that a part of the measurement beam path 25 of the measurement beam transmitter 32 is deflected into the first observation beam path 11.

In order to deflect the measurement beam path 25, optical components are provided in the first observation part 3, which according to this exemplary embodiment are a deflection prism 35 and a splitter prism 36. For this purpose, the splitter prism 36 is arranged on a surface 38 of a deflection prism 39 lying opposite the roof prism 37, or on the surface 38 of the roof prism 39 and connected thereto.

The surface 38 forms a beam splitter, by the fact that a partially transparent coating is provided thereon. By means of this coating, a reflection of the visual beam path 11 occurs on the surface 38, whereas the light coming from the laser transmitter 32 is not reflected and passes through the surface 38 unaffected. The combination of the optical beam path 25 of the measurement beam transmitter 32 with the first visual observation beam path 11 is therefore localized on the surface 38 of the deflection prism 39 or the splitter prism 36. In order to achieve this the direction of the beam path 25 of the measurement beam transmitter 32 and the direction of the first visual observation beam path 11 in its objective-side trajectory are co-aligned in the region of, or inside the deflection prism. By having the beam path 25 of the measurement beam transmitter 32 also passing the focusing device and the objective 5 in its trajectory towards the object, the measurement beam transmitter 32 or the beam path can be focused on the object or in the object plane.

With regard to the beam splitter provided in surface 38, different variant embodiments are possible. In the case where a wavelength-specific partially transparent coating is used, this must be tuned to the wavelength of the laser light of the measurement beam transmitter 32 that is used. This coating has a wavelength-dependent transmission characteristic, which exhibits a very high value of its transmission coefficient only in a very narrow range of wavelengths, wherein this narrow range of wavelengths corresponds to the wavelength of the laser radiation of the measurement beam transmitter 32 that is used. This laser radiation used can be in both the visible wavelength range and a non-visible wavelength range. The use of a measurement beam transmitter 32 emitting in the infrared range is preferable however, since this avoids an adverse effect on the visual observation.

Thus the adaptation of the observer's eye in twilight, for example, could be disturbed by scattered light from the measurement beam transmitter 32. In order to effect a splitting of the beam, the polarization of the applied laser light could alternatively be invoked for the selection. A further alternative possibility for a beam splitter involves a spatial division, by for example a metallic mirror being used for only a sub-region of the spatial angle of a beam path or a beam bundle.

After the reflection of the energy beam, e.g. the laser light, emitted by the measurement beam transmitter 32 at a remote object 40, reflected beams pass through the first visual beam path 11 together and re-enter the device 1. As a result of the partially transparent coating of the surface 38 between reversing prism 39 and the splitter prism 36, a separation of a measurement beam path 41, which travels to a measurement beam receiver 42, from the first visual observation beam path 11 takes place at this surface 38. In order to detect and/or measure the reflected laser radiation the measurement beam receiver 42 is provided, wherein e.g. the reflected laser light is fed by a measurement beam transmitter 32 to a laser transmitter through a receiving optical system 43, which according to this exemplary embodiment is formed by the splitter prism 36 and a receiver prism 44.

By having the first visual observation beam path 11 and the measurement beam path 20 at the surface 38 between the reversing prism 39 and the splitter prism 36 combined or split, a part of the measurement beam path 41 is thus also integrated into the first visual observation beam path 11. Thus, in this device 1 with a measurement device 2, to integrate the beam path 45 of the measurement beam transmitter 32 or the laser transmitter and the measurement beam path 41 into the first visual observation beam path 11, optical components are arranged, in which an intersection occurs between the first visual beam path 11 and the beam path 45 of the laser transmitter or the beam path 41 of the measurement beam receiver 42.

According to the exemplary embodiment described, the region of the intersection is furthermore localized on a single optical component, namely the surface 38 of the deflection prism 39. Thus both the supply of the radiation from the measurement beam transmitter 32, and the separation of the reflected laser radiation from the first visual observation beam path 11 take place on the single surface 38.

According to the invention therefore, the region of the intersection, i.e. the composition or decomposition of the beam paths 45, 41 on the one hand and the visual observation beam path 11 on the other, is arranged between the observer-side focal point of the objective 5 and the focusing device 18 or the objective 5.

Therefore the same arrangement of the optical components of the objective 5 and the focusing device 7 defines both the mapping between the remote object 40 and the image of the object 40 generated on the observer side, as well as the mapping of the measurement beam on to the remote object 40. This relative spatial arrangement of the aforementioned optical components has the particular advantage that by only changing the adjustment of a single optical component, namely the focusing device 7, the focus of both the first visual observation beam path 11 as well as of the beam path 45 of the measurement beam transmitter 32 and the measurement beam path 20 of the measurement beam receiver 42 can be set. This means that for each distance setting the radiation reflected back by the remote object can be used very efficiently for the range measurement.

The range measurement is made in the manner known per se, based on the principle of propagation time measurement of e.g. a laser pulse or a laser pulse train, which is emitted by the measurement beam transmitter 32 and reflected back by an object 40. From the ratio of the time difference between the emission of a laser pulse and the arrival of the reflected laser light to the speed of light the range of the sighted object 40 can be found. The arrival time of the reflected laser signal is detected by the receiver 21. A control and analysis unit 46 is provided for the calculation and for controlling the functions of the observation device 1. The value for the range then finally calculated can be displayed for the observer in the field of view, by an opto-electronic display element 47 being provided in one of the two observation parts 3, 4 with an appropriate set of display optics 48.

The display optics 48 is arranged according to this exemplary embodiment in the second observation part 4 in such a way that the beam path 49 of the display optics 48 is integrated into the ocular-side part of the second visual beam path 12. The region of the intersection of the beam path 49 of the display optics 48 with the second visual observation beam path 12 is localized as already described for the first observation part 3 on a partially reflecting surface 38 of a deflection prism.

It is of course also possible to display the calculated value of the range, or the target mark 28, in both or optionally in only one of the two observation parts 3, 4. In addition it is also possible advantageously to provide a display, external to the observation device 1, on which the measured range can be displayed continuously or intermittently or at the operator's instruction.

It is also possible, via remote transmission means 41, in particular via wireless remote transmission means 41, for example radio or infrared, to transmit the measured range and other data such as, for example, the chosen focus setting and/or an enlargement factor and/or brightness or temperature values, into different parts of the observation device 1 or separate dedicated devices for display and/or analysis. It is also advantageous however to store these in the device 1 or to link them together and store them for different types of analysis and on request, for example, to display them on a display device mounted on the outside of the observation device 1.

It is furthermore possible with these transmission means to transmit, or store, these data to or on an external display element, memory or computer, e.g. a PC, which can also be advantageously constructed or arranged independently of the observation device 1. Most advantageous however is the transmission of these data to a telescopic sight of a weapon or other systems for monitoring or controlling devices, which require range information of this kind.

Furthermore, in order to facilitate the sighting of an object 40 to be observed, the range of which is to be measured, a target mark 50 is additionally provided in the first observation part 3. The target mark 50 or a beam path 51 of the target mark 50 is relayed via a set of target mark optics 52 provided for the purpose in the ocular-side part of the first visual beam path 11. The area of the intersection of the beam path 51 to the target mark 50 is also localized on the surface 38 lying between the deflection prism 39 and the splitter prism 36.

According to an alternative embodiment it is also possible to integrate the beam path 49 of the display element 47, as well as the beam path 51 to the target mark 50, into the first observation part 3 of the observation device 1. Here it would be additionally advantageous, however, to use the display element 47 itself for generating the target mark 50. For the display element 47 an opto-electronic display element is preferably used, allowing an individual control of single image-forming pixels. A calibration of the target mark 50 can thus be easily performed. The application of the opto-electronic display element 47 furthermore also allows the shape of the target mark 50 to be freely chosen. Thus it is possible for example, for the observer, via a suitable input device, by means of software to cause the device electronics to choose a desired target mark 50 as the target mark from an appropriate memory and to display it. The simultaneous use of the display element 47 to also generate the target mark 50 has the particular advantage of reducing the number of components required to fabricate the observation device 1.

The target mark 50 can also be fabricated from an optical element and a light source however, for example a suitably shaped screen, and superimposed on the visual beam path of the observation parts 3, 4.

Both the display element 47, as well as the device for displaying the target mark 50 can be formed by appropriate opto-electronic components, in particular LED, LCD or similar displays.

Between the opto-electronic display element 47 and the control and analysis unit 46 a switching device can be arranged for displaying different symbols or data, for example a target mark 50 or a measurement.

Using such a switching device it is also additionally or independently possible to cause the target mark 50 or a measurement to be displayed in either one or both of the observation beam paths 3, 4.

It should also be mentioned that the focusing device 18 can have an adjustment drive 53 assigned to it, which in FIG. 3 is represented schematically by an adjustable cog rail arrangement in the observation part 4. The adjustment drive 53 can be equipped with a drive motor 54, which can be a stepper motor, for example. The controller for the adjustment drive 53 for the focusing device 18 can be connected, in the same way as that of the target mark 50 or the display element 47 and of the measurement beam receiver 42, to the control and analysis unit 46 with connecting leads represented schematically by dashed lines.

For the sake of correctness it should be noted that the individual parts of the measurement device 2, in particular the laser range finder 26 or the measurement beam transmitter 32, the measurement beam receiver 42, the display elements 47, the target mark 50 and an adjustment drive 53 or a drive motor 54 of the focusing device 18 can be connected to the control and analysis unit 46, or this connected to external display elements or storage devices or computers, via appropriate connecting leads or circuit boards, especially flexible circuit boards, or also by wireless connection paths using electromagnetic waves or non-optical signals.

As is more clearly seen from FIG. 4, it is also possible however, to connect the two observation parts 3, 4 together via two connection elements 7, 56.

In each of the two connection elements 7, 56 one or more hinges 13 can be arranged. It is thus possible that the connection elements 7, 56 can be fitted with a single hinge 13 with a pivot axis 14. The two observation parts 3, 4 are thus, as already previously described in detail with the aid of FIG. 2, pivotable relative to each other about this central pivot axis 14.

It is of course also possible, in addition to these hinges 13, to arrange further hinges between the observation parts 3, 4 and the ends of the connection elements 7, 56 facing them, so that each of the observation parts 3, 4 is adjustable relative to the connection element 7, 56 or to the parts of the connection elements 7, 56 that are pivotable via the hinges 13.

In the present exemplary embodiment the connection elements 7, 56 each have only one hinge 13. This hinge 13 is formed by means of 2 connection arms 57, 58, which are connected to the end regions facing each other so that they can pivot about the pivot axis 14. The connection arm 57 is connected to the observation part 4 and the connection arm 58 to the observation part 3, both in a rotationally fixed manner.

It is of course also possible that the connection element 7 or 56 be formed by multiple hinged bridges.

For this purpose the connection element 7, 56 or the connection arms 57, 58 can be connected to two arms of a hinge arrangement for the hinge 13. It is also possible however that the two ends of the connection arms 57, 58 facing each other interlock in such a way that they form the hinge 13 by means of an axle 59 penetrating both of them.

As can additionally be seen from the illustration in FIG. 5, both of the observation parts 3, 4 can also be connected together, or supported or guided relative to each other, via one or more connection elements 7, 56, which can be telescopically displaceable in a direction at right angles to the longitudinal axes 8, 9. These telescope arrangements 60 allow the distance 10 between the longitudinal axes 8, 9, or the observation beam paths 11, 12, to be matched to the eye spacing of each user of such a device 1.

The telescope arrangements 60 consist in each case of guide parts 61, 62 that are guided into one another, wherein the guide part 61 and the guide part 62 are stationarily connected to the observation parts 4 and 3 respectively.

These guide parts are mounted so that they can be displaced into one another in the manner of a sleeve, and thus facilitate an exactly parallel displacement of the two observation parts 3, 4 relative to each other in a direction perpendicular to the longitudinal axes 8, 9. In order to set a certain spacing 10 between the two observation beam paths 3, 4 the frictional resistance between the guide parts 61, 62 can be dimensioned such that it requires an increased force to change the spacing 10. It is of course also possible to provide a corresponding fixing at the desired spacing 10 by mechanically, magnetically or electrically controlled elements. By means of suitable end stopping means—not shown—preferably detachable as required, the maximum distance over which the two observation parts 3, 4 in the direction of the spacing 10 can be moved, can be limited.

In Fig. a further possible variant embodiment is shown, in which both the observation parts 3, 4 are only connected together via a single connection element 7. This connection element 7 in this case however, instead of the variant embodiment according to FIG. 1 in which it is located essentially in the ocular-side end region of the device 1, is now arranged in the objective-side end region of the device 1, thus, in the region of the objective 5 or closer to this. Accordingly the sub-regions 22, 23 of the observation parts 3, lying opposite each other, extend between an ocular-side front face 31 of the connection element 7 and the ocular-side end of the observation parts 3, 4 or of the housing 1. In this case also, it is advantageous if the length 24 over which sub-regions 22, 23, or side surfaces, of the observation parts 3, 4, directly facing each other, extend over a proportion of 20%-90%, preferably 30%-80%, of the length 24 of the observation parts 3, 4.

In general it can be understood that an advantageous variant embodiment is one in which die width 27 of the connection element 7 or the sum of the widths 27, 28 of multiple connection elements 7, 56 which connect the two observation parts 3, 4 along the longitudinal axes 8, 9, is less than 80 to 100 mm, preferably 90 mm. It should preferably be taken into account that the width of the connection element or the sum of the widths 27, 28 of multiple connection elements between the two observation parts 3, 4 along the longitudinal axis 8, 9 be less than 45% of the length 24 or the spacing between the objective-side end 30 and the ocular-side end 55.

It is advantageous here if the length 21 of the sub-regions 22, 23 to be left clear has a length of more than 30 mm, preferably 50 to 120 mm.

Figure 7:
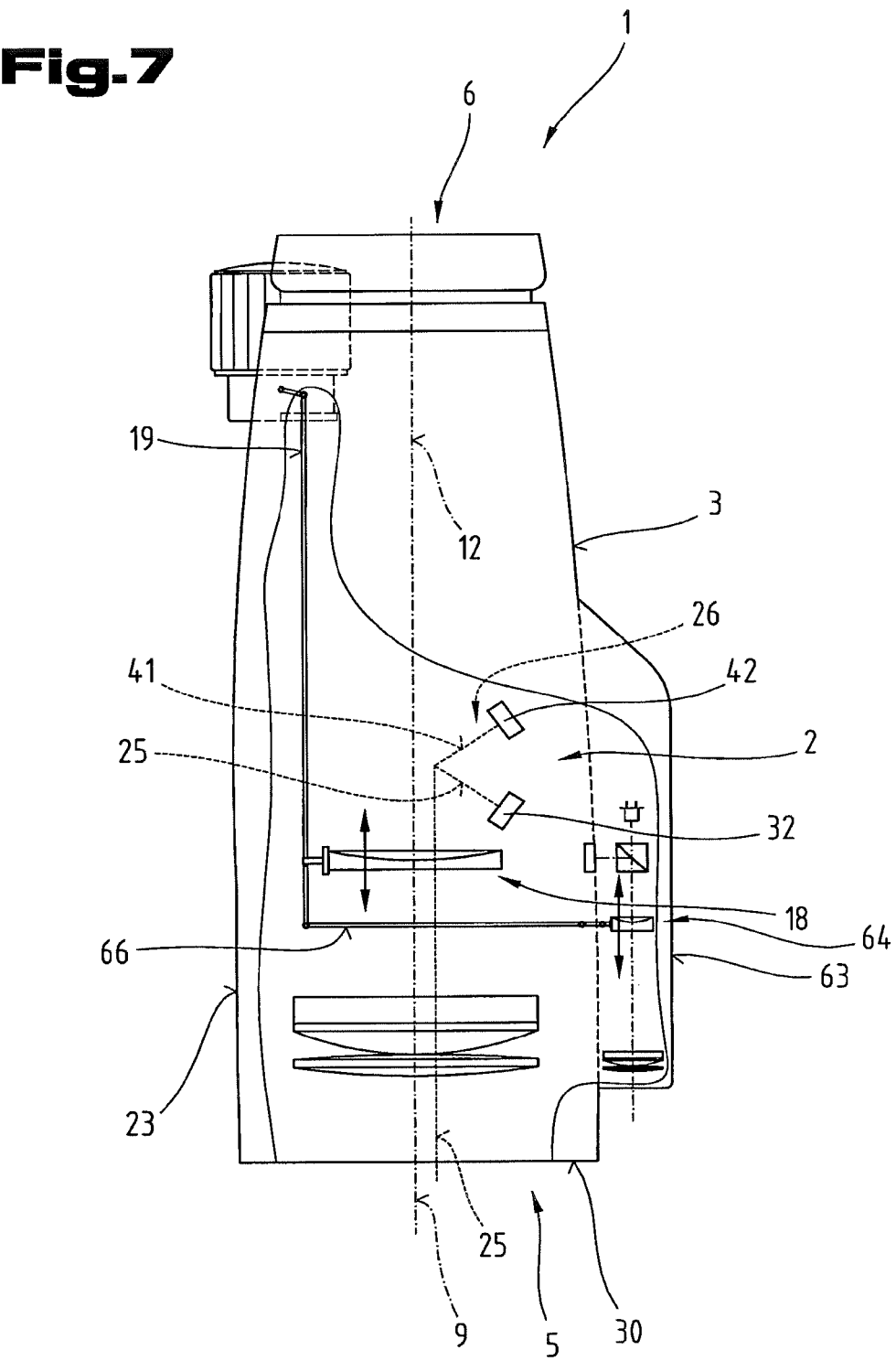
FIG. 7 is a partial section of a long-range optical device with a measurement beam path arranged in addition to the observation beam paths, in a side view.

In FIG. 7 a long-range optical device 1 is shown in a partially exploded side view, wherein equivalent parts are assigned identical labels as in the preceding figures.

From this drawing it can be seen that the focusing device 18 is provided for the observation beam path 12. The adjustment of the focusing device 18 is effected for example via the transmission elements 19, only shown schematically, and with regard to the adjustment procedure by means of the adjustment device 17, reference is made to the corresponding parts of the description in FIG. 1. In this case however, the measurement device 2, i.e. the laser range finder 26, is not arranged directly in the tube or housing of the observation part 3, but in a corresponding flared portion 63, which is located for example in the usage position of the device 1, or the device 1 primarily designed for manual holding and manual sighting, or binoculars, on the underside thereof. The laser range finder 26 with the control and analysis unit 46—not shown—is now arranged in this flared portion 63, as is indicated schematically by the measurement beam paths 25 and 41 of the measurement beam transmitter 32 and measurement beam receiver 42, for example as a laser-receiver-transmitter. Since the measurement beam path 25 and 41 now extend parallel to but spaced apart from the observation beam path 12, these two measurement beam paths 25, 41 can be focused via an additional dedicated focusing device 64, arranged between the measurement beam transmitter 32 and measurement beam receiver 42 and the dedicated objective 65 assigned thereto.

Without facilitating a synchronous focusing of the measurement beam paths 25 and 41, the adjustment device 17 is connected via the transmission elements not only to the focusing device 18 for the observation beam path, but with other transmission elements 66, to the focusing device 64 also. A suitable translation can then be provided between the focusing device 18 and the focusing device 64, so that an accurate focusing of the beam paths 25 and 41 can take place at the same time as the focusing of the observation beam path 11; 12. Solely for the sake of correctness it should be mentioned that the arrangement of the flared portion 63 is done in such a way that it does not project—as described previously—into the region to be left clear between the sub-regions 22 and 23.

The measurement beam transmitter 32 and measurement beam receiver 42 and the opto-electronic display elements have a dedicated analysis unit for determining the propagation time, or a propagation time calculation device is integrated into the control and analysis unit 46.

Between the opto-electronic display element 47 and the control and analysis unit 46, it is also possible to provide an additional switching device, or switching elements directly activatable by using this, in order to display different symbols or data, for example a target mark 50 and/or a measurement.

It is also possible by using a switching device, to optionally introduce the beam paths 51, 49 of the opto-electronic display element 47 into at least one of the observation beam paths 11; 12 for displaying a target mark and a measurement.

Independently of the optical components, it is advantageous if the opto-electronic and electronic components and the electrical supply components are arranged in both of the observation parts 3, 4 in such a manner that a balanced weight distribution takes place. In this case it is advantageous if these opto-electronic and electronic components are arranged in the two observation parts 3, 4 with respect to their weight such that a uniform, symmetrical weight loading is obtained with regard to the pivot axis 14.

Figure 8:
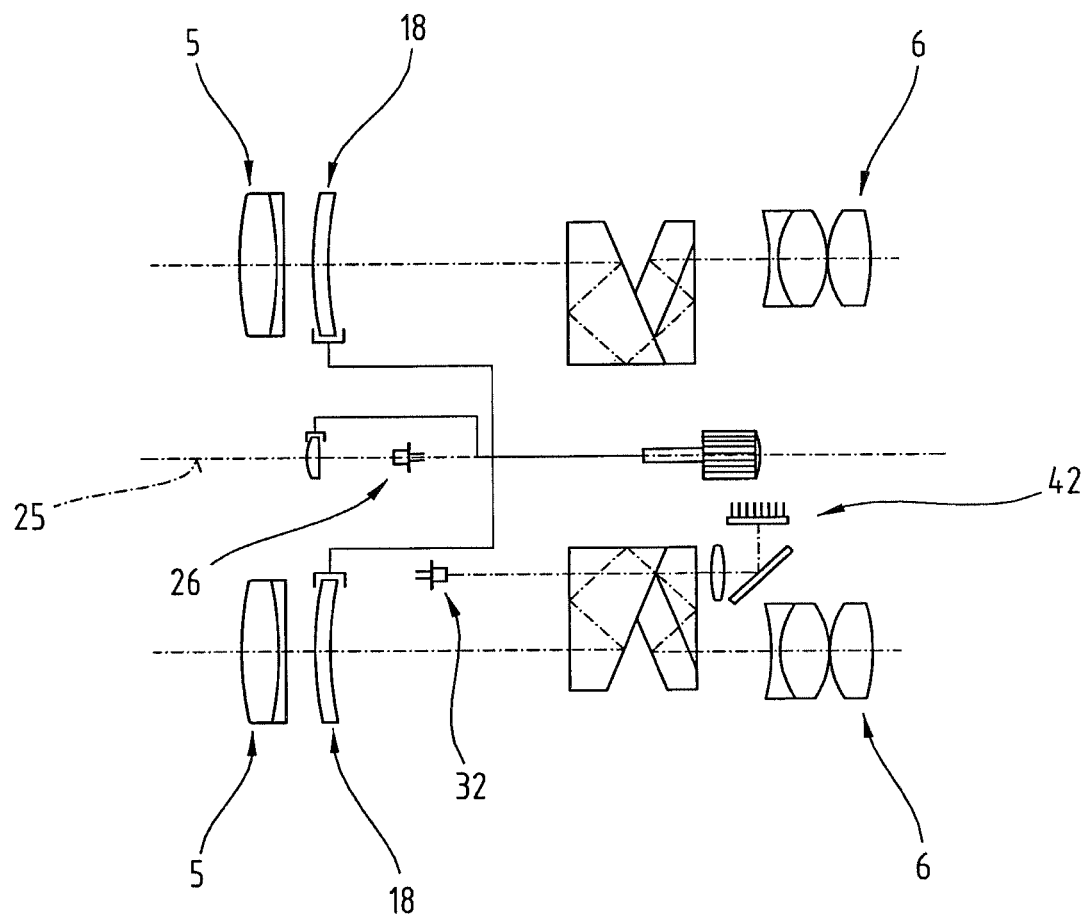
FIG. 8 is a further exemplary embodiment of a device with a third beam path.

FIG. 8 shows a device 1 with a laser range finder 26, in which for the measurement beam path 25 of the measurement beam transmitter 32 an arrangement separate from the observation beam paths 11, 12, and therefore a third beam path, is provided.

To set the focus, a focusing device 18 formed by a focusing lens is integrated into each of the first and second observation beam path 11, 12. In the measurement beam path 25 of the measurement beam transmitter 32, a transmitter focusing device is arranged on the object side before the measurement beam transmitter 32. By adjustment of the transmitter focusing device, the image of the measurement beam transmitter 32 can be brought into focus in the object plane of a remote object. According to the invention, in this device 1 the transmitter focusing device is coupled to the focusing device 18 of the two visual observation beam paths 11, 12, so that a focusing of the image of the measurement beam transmitter 32 can take place simultaneously with the focusing of the images of the visual observation beam paths 11, 12.

Figure 6:
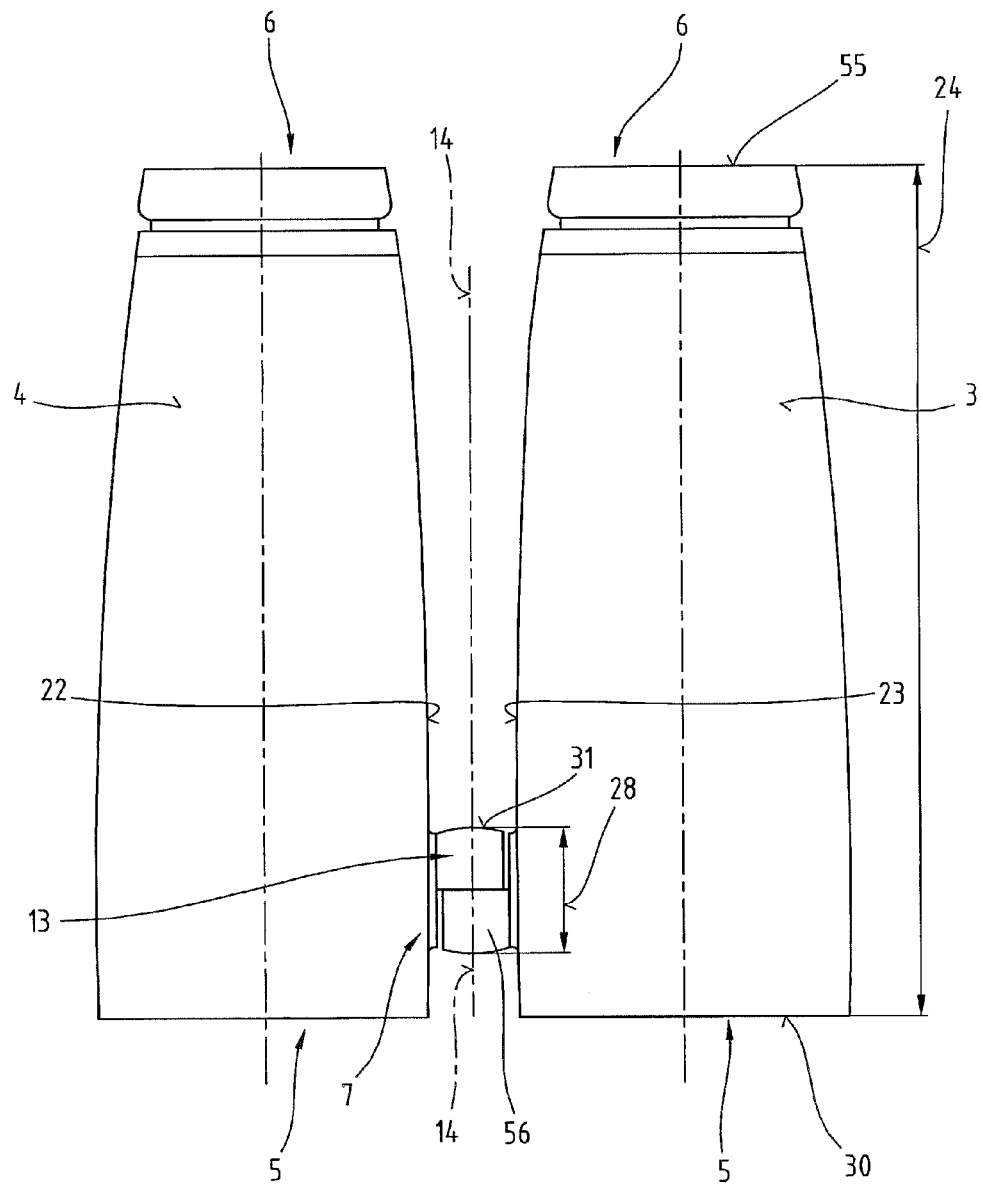
FIG. 6 is another embodiment of the arrangement of the connection element between the observation parts of a long-range optical device in plan view.

With the observation devices 1 according to the exemplary embodiments described in FIGS. 6 and 7, a procedure corresponding to one of the methods described for the observation and measurement of the range is possible, and in particular one for an automatic or semi-automatic focusing process.

In particular when two connection elements 7, 56 are provided, it must be ensured that in a plan view of the device 1 with respect to a plane 20 in which the longitudinal axes 8, 9 of the observation parts 3, 4 are arranged, over a length 24 aligned parallel to the longitudinal axis 8, 9 of the observation parts 3, 4, of for example 20%-90%, preferably 30%-80% of the observation parts 3, 4 these sub-regions 22, 23 facing each other lie directly opposite each other. Over this length 24 therefore, the free space located between these sub-regions 22, 23 is not restricted by any single part of the observation parts 3, 4 or the connection elements 7, 56, nor by a visual observation beam path 11, 12 or the measurement beam path 25, 41. This is taken to mean that the observation beam paths 11, 12 and the measurement beam paths 25, 41 are located either inside the observation parts 3, 4, or emitted in such a way that they are located outside this cuboid shaped free space formed by the connection element or elements and the sub-regions 22, 23 of the observation parts 3, 4 that face each other, which extends perpendicular to the aforementioned plane. The length 21 of the region to be kept clear should be between 20%-90%, preferably 30%-80% of the length 24 of the observation parts 3, 4.

Solely for the sake of completeness it should be noted that the observation parts 3, 4, or the housing forming them, can be constructed in the form of tubes or tubular housing.

This tubular housing or tubes can also only extend over a part of the length 24 of the observation parts 3, 4 and can consist of a light metallic material, in particular of magnesium or a magnesium based alloy. The tubular housing or tubes, or observation parts 3, can be fabricated from a main housing, which as previously mentioned can be formed from light metallic materials or composite materials. Independently of this, at least as far as the basic structure is concerned, these housing parts can be constructed symmetrically. This relates above all to the cylindrical and conical sections of the main housing and preferably to those parts which are required for the mounting, fixing and support of the optical components, for example the objective 5 and ocular 6 or the focusing device 18. independent of this it is of course possible to provide this main housing with different reinforcement elements and cladding elements, which can also be arranged only partially over the outer or inner surface of the observation parts 3, 4, or of their main housing.

Within the scope of the invention it is also possible however to fabricate these observation parts 3, 4 or their tubes or tubular housing from composite material, in particular from fiber-reinforced plastic, wherein the widest range of fibers known from the prior art, also in particular high-strength fibers such as carbon, glass and aramide fibers can be applied.

The exemplary embodiments show possible variant embodiments of the device 1, wherein it should be noted at this point that the invention is not limited to the variant embodiments of the devices specifically illustrated, rather that various combinations of the individual variant embodiments among themselves are also possible, and due to the teachings on technical activity by invention in the relevant subject matter, this possibility of variation lies within the expertise of a person skilled in the art in this technical field. There are also therefore any number of conceivable variant embodiments, which are possible by combinations of individual details of the variant embodiment illustrated and described, also included in the scope of protection.

For the sake of correctness it should be finally pointed out that to allow a better understanding of the structure of the device 1 these or their component parts have been partially illustrated not to scale and/or enlarged and/or reduced in size.

The problem addressed by the independent inventive solutions can be understood from the description.

In particular, the individual embodiments shown in FIGS. 1 to 3, 4, 5, 6, 7 and 8 form the subject matter of independent solutions according to the invention. The corresponding problems and solutions according to the invention can be understood from the detailed descriptions of these Figures.

The invention claimed is:

1. A long-range optical device comprising:
   first and second observation parts and optical components arranged therein forming respective first and second observation beam paths, each of the observation parts including objective and ocular ends;
   a laser range finder forming a measurement beam path with a transmitter beam path and a receiver beam path, the measurement beam path at least partially overlapping with one of the observation beam paths; and
   two connection elements arranged between the objective and ocular ends of the first and second observation parts and longitudinally spaced from each other, and defining a free space between the observation parts extending along at least a portion of the distance between the objective and ocular ends thereof, each of the connection elements comprises a hinge having a pivot axis, the free space having a length of 20%-90% of the length of the observation parts, and being configured such that a user's fingers can protrude unhindered between the two observation parts, and wherein the transmitter beam path is arranged separate from the observation beam paths as a third beam path.

2. The long-range optical device of claim 1, wherein each of the first and second observation parts has a longitudinal axis, the free space extends over a length extending parallel to the longitudinal axis of the observation parts of 30%-80% of the length of the observation parts.

3. The long-range optical device of claim 1, wherein the free space extends between the two connection elements over a length of more than 30 mm.

4. The long-range optical device of claim 1, wherein the transmitter beam path is provided on the connection element at the objective end.

5. The long-range optical device of claim 1, wherein the transmitter beam path is located in the region of the pivot axis of the hinge.

6. The long-range optical device of claim 1, wherein each of the first and second observation parts has a longitudinal axis, the free space has a length of 50 mm to 120 mm along longitudinal axes of the observation parts.

7. The long-range optical device of claim 1 further comprising an opto-electronic display element arranged in at least one of the two observation parts.

8. The long-range optical device of claim 1, wherein at least one of the optical components is arranged to feed the receiver beam path into the first observation beam path.

9. The long-range optical device of claim 1, comprising a first focusing device to focus the two observation beam paths and the receiver beam path.

10. The long-range optical device of claim 1, comprising a device for determining propagation time connected to the measurement beam path of the laser range finder.

11. The long-range optical device of claim 7, comprising a control and analysis unit, and a switching device for displaying different symbols or data, the switching device is arranged between the opto-electronic display element and the control and analysis unit.

12. The long-range optical device of claim 7, wherein the opto-electronic display element is connected to a switching device for optionally feeding in the beam paths for displaying a target mark and/or a measurement in at least one of the observation beam paths.

13. The long-range optical device of claim 1, wherein the observation parts comprise at least one tubular housing.

14. The long-range optical device of claim 13, wherein the at least one tubular housing comprises a material selected from the group consisting of magnesium, magnesium alloy, and fiber-reinforced plastic.

15. The long-range optical device of claim 1, wherein each of the first and second observation parts has a longitudinal axis, the spacing between the longitudinal axes of the first and second observation parts in a plane extending through them is between 50 mm and 70 mm.

16. The long-range optical device of claim 1, wherein each of the first and second observation parts has a longitudinal axis, the pivot axis of the hinge is centrally arranged between the longitudinal axes of the first and second observation parts.

17. The long-range optical device of claim 1, further comprising at least one focusing device and an adjustment drive connected to the at least one of the focusing device.

18. The long-range optical device of claim 17, comprising a control and analysis unit connected to the adjustment drive.

19. The long-range optical device of claim 1, comprising electrical components arranged in the two observation parts, the optical and electrical components are arranged symmetrically with respect to the pivot axis.

20. The long-range optical device of claim 1, wherein each of the first and second observation parts has a longitudinal axis, the sum of the widths of the two connection elements along the longitudinal axes is less than 100 mm.

21. The long-range optical device of claim 1, wherein the laser range finder is adapted to be connected to a storage device.

* * * * *